United States Patent
Moros Ortiz et al.

(10) Patent No.: US 12,484,846 B2
(45) Date of Patent: Dec. 2, 2025

(54) USER STATE-OF-FLOW-BASED ENVIRONMENT CONFIGURATION USING ARTIFICIAL INTELLIGENCE AND BIOMETRIC DATA

(71) Applicant: KYNDRYL, INC., New York, NY (US)

(72) Inventors: Jorge Andres Moros Ortiz, Melbourne (AU); Sahitya Pidaparthi, Point Cook (AU); Vicky A Rose, Hawthorn (AU); Emily Jy Wong, Melbourne (AU)

(73) Assignee: Kyndryl Inc., New York, NY (US)

( * ) Notice: Subject to any disclaimer, the term of this patent is extended or adjusted under 35 U.S.C. 154(b) by 1272 days.

(21) Appl. No.: 16/940,328

(22) Filed: Jul. 27, 2020

(65) Prior Publication Data

US 2022/0022808 A1    Jan. 27, 2022

(51) Int. Cl.
*A61B 5/00*    (2006.01)
*A61B 5/374*    (2021.01)
*G06F 3/01*    (2006.01)
*G16Y 40/10*    (2020.01)
*G16Y 40/20*    (2020.01)
*A61B 5/16*    (2006.01)

(52) U.S. Cl.
CPC ............ *A61B 5/486* (2013.01); *A61B 5/374* (2021.01); *G06F 3/015* (2013.01); *G16Y 40/10* (2020.01); *G16Y 40/20* (2020.01); *A61B 5/165* (2013.01)

(58) Field of Classification Search
CPC ......... A61B 5/486; A61B 5/374; A61B 5/165; G16Y 40/10; G16Y 40/20; G06F 3/015
See application file for complete search history.

(56) References Cited

U.S. PATENT DOCUMENTS

| | | | |
|---|---|---|---|
| 4,958,638 A | 9/1990 | Sharpe | |
| 9,710,788 B2 | 7/2017 | Horseman | |
| 9,743,381 B1 | 8/2017 | Alam | |
| 2013/0012763 A1* | 1/2013 | De Waele | G16H 20/70 600/26 |

(Continued)

OTHER PUBLICATIONS

Neuman, M. R. "Biopotential Electrodes." The Biomedical Engineering Handbook: Second Ed. Joseph D. Bronzino; Boca Raton: CRC Press LLC, 2000 (Year: 2000).*

(Continued)

*Primary Examiner* — Pamela M. Bays
(74) *Attorney, Agent, or Firm* — Erik Swanson; Andrew D. Wright; Calderon Safran & Wright P.C.

(57) ABSTRACT

Modifying an environment based on a user's state of flow includes receiving, by a computer, measurements associated with biometric data of the user from a plurality of sensors, the measurements corresponding to an electric frequency associated with a current state of the user. The computer determines whether the measurements correspond to a specified electric frequency threshold, and when the measurements satisfy the specified electric frequency threshold, identifies a first setting of one or more elements located in the user's environment. Each of the one or more elements controls an environmental parameter of the user's environment. The first setting of each of the one or more elements are stored in a library of environmental conditions associated with a state of flow of the user.

15 Claims, 6 Drawing Sheets

(56) References Cited

U.S. PATENT DOCUMENTS

| | | | | |
|---|---|---|---|---|
| 2014/0336473 A1* | 11/2014 | Greco | ............... | A61B 5/7225 600/509 |
| 2015/0265201 A1* | 9/2015 | Arbas | ................. | A61B 5/369 600/595 |
| 2016/0151603 A1* | 6/2016 | Shouldice | ............. | H04R 3/00 600/26 |
| 2016/0196758 A1* | 7/2016 | Causevic | ............ | A61B 5/165 434/236 |
| 2016/0339300 A1* | 11/2016 | Todasco | ............. | A61B 5/486 |
| 2017/0371413 A1* | 12/2017 | Alam | ................ | A61B 5/0006 |
| 2019/0086890 A1* | 3/2019 | Bradley | ............... | E03C 1/057 |
| 2019/0110726 A1* | 4/2019 | Chatterjee | .......... | A61B 5/7275 |
| 2019/0278310 A1* | 9/2019 | Lalanne | ............. | G05B 15/02 |
| 2019/0342602 A1 | 11/2019 | Aimone | | |

OTHER PUBLICATIONS

"What are Brainwaves? Types of Brain waves", brainworks, last printed May 27, 2020, 5 pages, <https://www.brainworksneurotherapy.com/what-are-brainwaves>.

Al-Hudhud, et al., "Analyzing Passive BCI Signals to Control Adaptive Automation Devices", Advanced Intelligent Control through Versatile Intelligent Portable Platforms, Jul. 10, 2019, 14 pages, <https://www.mdpi.com/1424-8220/19/14/3042/htm>.

Al-Hudhud, Ghada, "Smart Brain Interaction Systems for Office Access and Control in Smart City Context", Smart Cities Technologies, Dec. 7, 2016, Chapter 6, pp. 101-119, <https://www.intechopen.com/books/smart-cities-technologies/smart-brain-interaction-systems-for-office-access-and-control-in-smart-city-context>.

Chung, et al., "The Effect of Rosemary Aromatherapy on Memory", The Korea Journal of Herbology, 2006, vol. 21, Issue 4, English Abstract only, pp. 207-212, <http://www.koreascience.or.kr/article/JAKO200636038276809.page>.

Dryden, Jim, "Team develops wireless, dissolvable sensors to monitor brain", Washington University School of Medicine in St. Louis, Jan. 18, 2016, 5 pages, <https://medicine.wustl.edu/news/team-develops-wireless-dissolvable-implants-to-monitor-brain/>.

Foroughi, et al., "Do Interruptions Affect Quality of Work?", Human Factors: The Journal of the Human Factors and Ergonomics Society, Sage Journals, Apr. 22, 2014, Abstract Only, 6 pages, <https://journals.sagepub.com/doi/abs/10.1177/0018720814531786>.

Hadi, et al., "Warm Hearts and Cool Heads: Uncomfortable Temperature Influences Reliance on Affect in Decision-Making", JACR, vol. 4, No. 2, Jan. 17, 2019, pp. 102-114, <https://www.journals.uchicago.edu/doi/abs/10.1086/701820>.

Harland, et al., "Remote detection of human electroencephalograms using ultrahigh input impedance electric potential sensors", Applied Physics Letters, vol. 81, No. 17, Oct. 21, 2002, pp. 3284-3286.

Jebelli, et al., "An EEG Signal Processing Framework to Obtain High Quality Brain Waves 1 from an Off-the-Shelf Wearable EEG Device", Journal of Computing in Civil Engineering, 32 (1), Oct. 2017, 39 pages, <https://www.researchgate.net/publication/319550134_>.

Katahira, et al., "EEG Correlates of the Flow State: A Combination of Increased Frontal Theta and Moderate Frontocentral Alpha Rhythm in the Mental Arithmetic Task", Frontiers in Psychology, Mar. 2018 | vol. 9 | Article 300, pp. 1-11, <https://www.frontiersin.org/articles/10.3389/fpsyg.2018.00300/full>.

Keirn, et al., "Man-Machine Communications Through Brain-Wave Processing", IEEE Engineering in Medicine and Biology Magazine, Mar. 1990, pp. 55-57, <https://ieeexplore.ieee.org/document/62907/references#references>.

Kombiez, et al., "Facilitation of creative performance by using blue and red accent lighting in work and learning areas", Ergonomics—Jun. 2017, 28 pages, <https://europepmc.org/article/MED/28662616>.

Kotler, Steven, "Create a Work Environment That Fosters Flow", Harvard Business Review, Updated Oct. 11, 2019, 5 pages, <https://hbr.org/2014/05/create-a-work-environment-that-fosters-flow>.

Kotler, Steven, "Flow States and Creativity", Psychology Today, Posted Feb. 25, 2014, 4 pages, <https://www.psychologytoday.com/au/blog/the-playing-field/201402/flow-states-and-creativity>.

Mell et al., "The NIST Definition of Cloud Computing", National Institute of Standards and Technology, Special Publication 800-145, Sep. 2011, 7 pages.

Plotnikov, et al., "Exploiting real-time EEG analysis for assessing flow in games", 2012 12th IEEE International Conference on Advanced Learning Technologies, pp. 688-689, <https://ieeexplore.ieee.org/stamp/stamp.jsp?tp=&arnumber=6268219>.

Roomer, Jari, "How to Reach Flow State (Using 10 Flow State 'Triggers')", Medium, Personal Growth Lab, Feb. 12, 2019, 13 pages, <https://medium.com/personal-growth-lab/how-to-reach-flow-state-using-10-flow-state-triggers-473aa28dc3e5>.

Shih, et al., "Background music: Effects on attention performance", Work, 2012, vol. 42, No. 4, pp. 573-578, <https://content.iospress.com/articles/work/wor01410>.

Stopczynski, et al., "The Smartphone Brain Scanner: A Portable Real-Time Neuroimaging System", PLoS One, Feb. 2014 | vol. 9 | Issue 2, pp. 1-10, <https://www.ncbi.nlm.nih.gov/pmc/articles/PMC3914802/>.

Van Den Hout, et al., "The Conceptualization of Team Flow", The Journal of Psychology, 152:6, Aug. 8, 2018, pp. 388-423, <https://www.tandfonline.com/doi/full/10.1080/00223980.2018.1449729>.

* cited by examiner

USER STATE-OF-FLOW-BASED ENVIRONMENT CONFIGURATION USING ARTIFICIAL INTELLIGENCE AND BIOMETRIC DATA

BACKGROUND

The present invention generally relates to the field of artificial intelligence (AI), and more particularly to a method, system and computer program product for configuring an environment based on a user's state of flow determined using biometric data.

A state of flow is a mental state in which a person performing an activity is fully immersed in a feeling of energized focus, full involvement, and enjoyment in the process of the activity. In this state, the person's brainwaves move from the fast-moving beta wave of normal waking consciousness down to the far slower borderline between alpha and theta waves.

Many people are exposed to a constant stream of information (e.g., emails, text messages, social media notifications, etc.) and/or surrounded by poor quality work and living environments that promote disengagement, apathy, and distraction from daily activities instead of a state of flow.

SUMMARY

Shortcomings of the prior art are overcome and additional advantages are provided through the provision of a computer-implemented method for modifying an environment based on a user's state of flow. The method includes receiving, by a computer, measurements associated with biometric data of the user from a plurality of sensors, the measurements correspond to an electric frequency associated with a current state of the user, the user being located in the environment. The computer determines whether the measurements correspond to a specified electric frequency threshold. In response to determining that the measurements correspond to the specified electric frequency threshold, the computer identifies a first setting of one or more elements located in the environment, the one or more elements controlling a plurality of environmental parameters, and generates a library comprising the first setting of the one or more elements.

Another embodiment of the present disclosure provides a computer program product for modifying an environment based on a user's state of flow, based on the method described above.

Another embodiment of the present disclosure provides a computer system for modifying an environment based on a user's state of flow, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
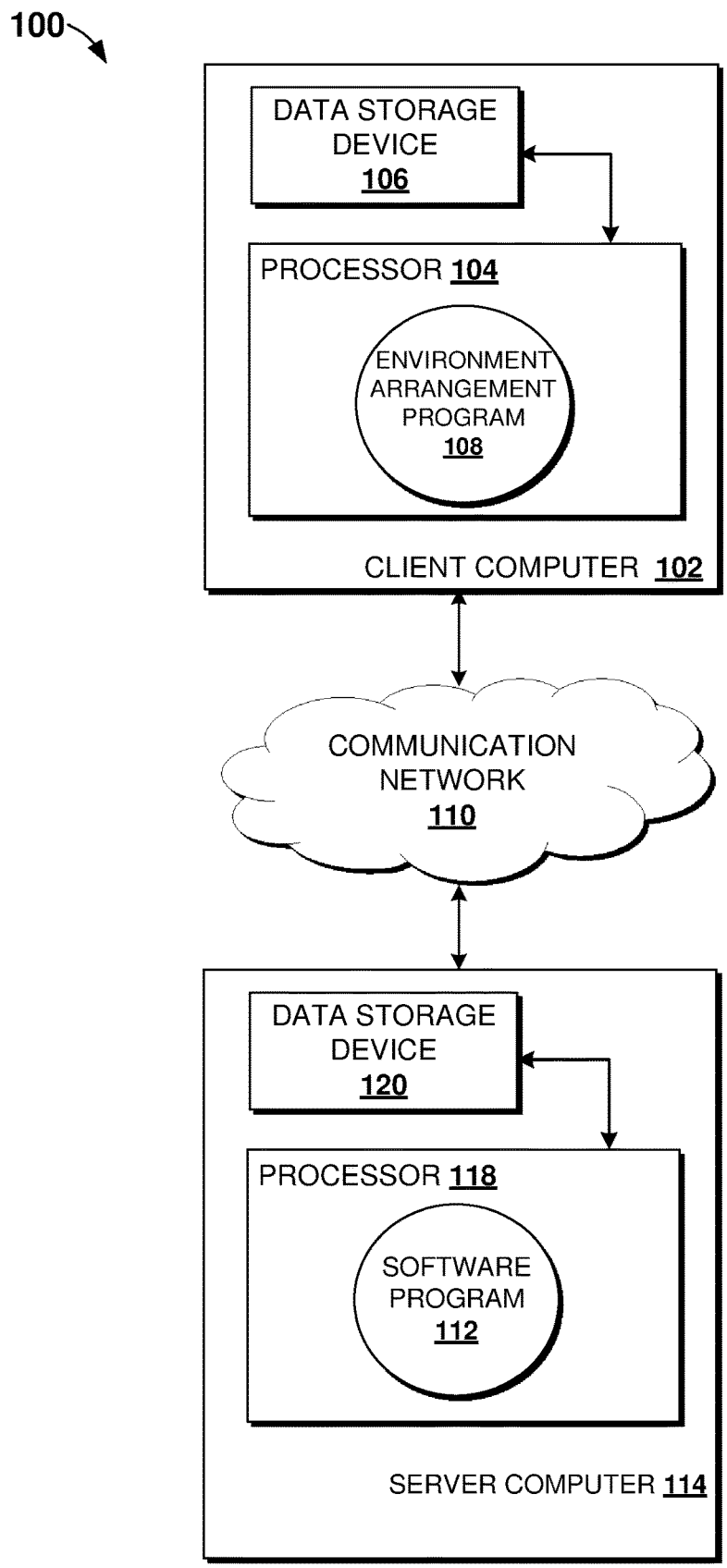
FIG. 1 is a block diagram illustrating a networked computer environment, according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

In positive psychology, a state of flow is a mental state in which a person performing an activity is fully immersed in a feeling of energized focus, full involvement, and enjoyment in the process of the activity. All humans possess five different types of electric patterns, also called "brainwaves" across the cortex. Namely, gamma, beta, alpha, theta and delta waves arranged from fastest to slowest. The state of flow typically occur in the alpha-theta border (7-8 Hz), which is the limit between the conscious and the subconscious mind. This is the brain state of "being in the zone" where work feels effortless, constant creativity and optimal performance takes place, and rapid decisions can be combined with creative insights.

Different parameters in the environment surrounding a person or user of a space can positively or negatively affect his/her ability to reach a state of flow. For example, constantly receiving email notifications or text messages, and/or being in a cold room can be too distracting for a person to focus on a specific task (i.e., brainwave activity increases). On the other hand, the same person can feel more relaxed and focused when notifications are turned off during a certain period of time, and the room temperature is set to a preferred number (i.e., brainwave activity decreases).

Standard measurements of brainwave activity are typically performed using an electroencephalogram (EEG) test. However, current advances in EEG technology allows the monitoring of brainwave activity to be performed in a less invasive form. Specifically, variations in brainwave activity can be monitored using current contactless EEG technology available or incorporated in various smart devices.

By monitoring a user's brainwave activity, the brainwave range associated with that user entering a state of flow can be identified, and different parameters in the environment surrounding the user (e.g., room temperature, music, lighting, noise levels, etc.) can be detected and stored in a personalized library of environmental elements that provides the user with a collection of conditions that can facilitate entering and staying in the state of flow. The detected environmental elements can then be actuated (manually or automatically) by the user to reproduce an environment that promotes a state of deeper focus and concentration. For example, the user may mimic the same environmental conditions and minimizing distractions for completion of a specific task.

Therefore, embodiments of the present invention provide a method, system, and computer program product for configuring a user's environment to promote a state of flow determined using biometric data. The following described exemplary embodiments provide a system, method, and computer program product to, among other things, create a personalized library or centralized repository (knowledge base) where information regarding different environmental parameters corresponding to a user entering and staying in a state of flow are stored and organized. Specifically, embodiments of the present disclosure may allow one or more users to reproduce individual or group environmental settings in a determined space, from the personalized library, in order to facilitate achieving a state of flow. Thus, the present embodiments have the capacity to improve the technical field of artificial intelligence by obtaining information regarding a user's biometric indicators associated with states of deeper focus and concentration, recording this information, and creating a library of environmental conditions that may be optimal for completion of cognitively demanding activities.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a processor 104, that is enabled to run an environment arrangement program 108, and a data storage device 106. Client computer 102 may be, for example, a mobile device, a telephone (including smartphones), a personal digital assistant, a netbook, a laptop computer, a tablet computer, a desktop computer, or any type of computing devices capable of accessing a network.

The networked computer environment 100 may also include a server computer 114 with a processor 118, that is enabled to run a software program 112, and a data storage device 120. In some embodiments, server computer 114 may be a resource management server, a web server or any other electronic device capable of receiving and sending data. In another embodiment, server computer 114 may represent a server computing system utilizing multiple computers as a server system, such as in a cloud computing environment.

The environment arrangement program 108 running on client computer 102 may communicate with the software program 112 running on server computer 114 via the communication network 110. As will be discussed with reference to FIG. 4, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a cellular or mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2:
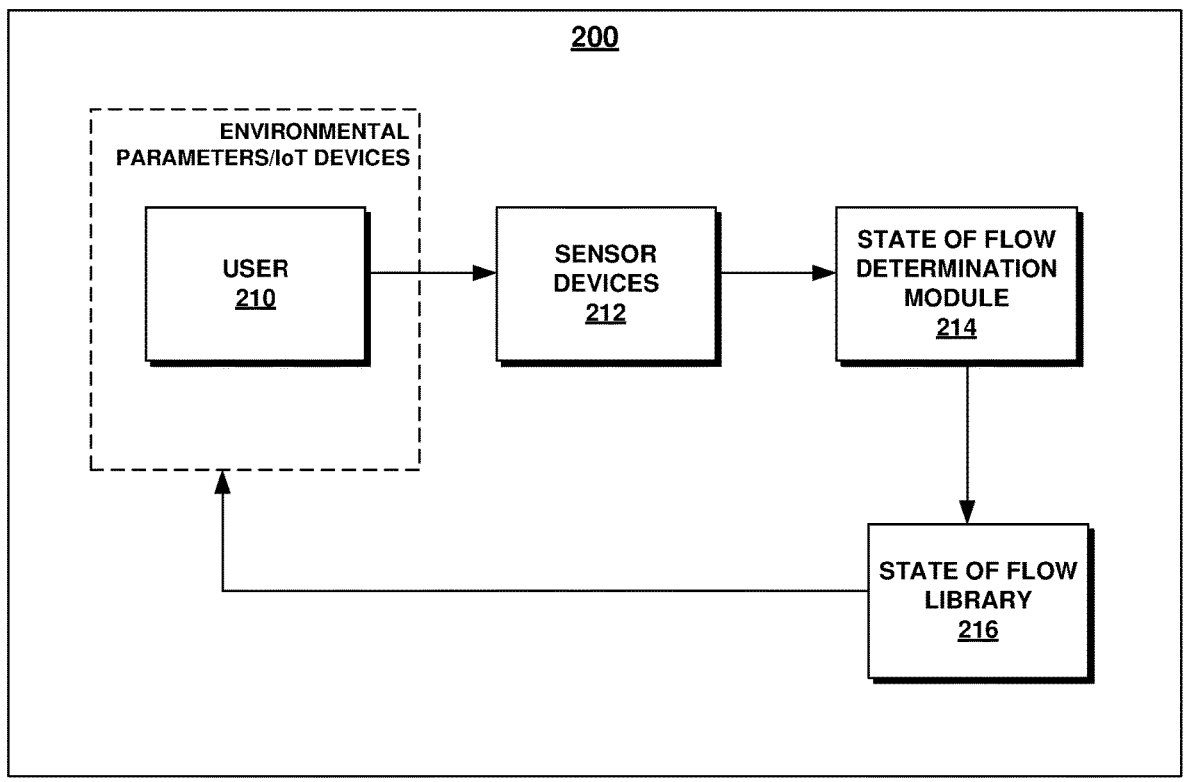
FIG. 2 depicts a system for arranging an environment based on a user's state of flow, according to an embodiment of the present disclosure.

Referring now to FIG. 2, a system 200 for arranging a user's environment based on promoting a state of flow is shown, according to an embodiment of the present disclosure.

In this embodiment, a user 210 is in an environment or space under certain environmental parameters. The environmental parameters may include a temperature, a music volume, a light intensity, etc. These parameters are associated or controlled by one or more elements in the user's environment. For example, one element may include a thermostat set at a specific temperature. Another element may include a light bulb set to a certain intensity. In an embodiment, the one or more elements associated with the environmental parameters may include internet of things (IoT) devices. In some embodiments, the user 210 may be, for example, in a smart home where the surrounding environmental parameters can be automatically updated based on a record of user's preferences. Preferably, the one or more elements existing in the user environment can collect and store information regarding the environmental parameters surrounding the user (e.g., room temperature, light intensity, noisy level, etc.) over a period of time.

A plurality of sensor devices 212 (hereinafter "sensor devices") may collect biometric data from the user 210. In an embodiment, the sensor devices 212 may include any known wearable sensor device capable of monitoring user's biometric signals including brain electric patterns that can help identifying a current state of the user. Specifically, the sensor devices 212 may determine variations in user's electric patterns associated with intervals of low, medium, and high brain electrical activity frequency that can be associated with different levels of awareness. According to an embodiment, the sensor devices 212 may be incorporated in any device wore by the user (e.g., headphones, wristbands, helmets, smart glasses, etc.). In other embodiments, the sensor devices 212 may include sensors surrounding the user that are in close proximity to the user's head (e.g., sensors fitted in the environment, sitting equipment, or computer equipment).

It should be noted that any user data collection (e.g., environmental data, biometric data, etc.) is done with user consent via an opt-in and opt-out feature. As known by those skilled in the art, an opt-in and opt-out feature generally relates to methods by which the user can modify a participating status (i.e., accept or reject the data collection). In some embodiments, the opt-in and opt-out feature can include a software application(s) available in the wearable device or client computer 102. Additionally, the user can choose to stop having his/her information being collected or used. In some embodiments, the user can be notified each time data is being collected. The collected data is envisioned to be secured and not shared with anyone without user's consent. The user can stop the data collection at any time.

The state of flow determination module 214 analyses the data collected from the sensor devices 212, and determines whether the current state of the user 210 corresponds to a state of flow. As mentioned above, a person's state of flow typically occurs at a brainwave frequency of approximately 7-8 Hz. When the state of flow determination module 214 determines that the received data corresponds to the user entering a state of flow, the system 200 scans the user's surrounding and records an existing configuration or setting of the one or more elements present in the user's space. The system 200 then matches the received biometric information with current environmental conditions surrounding the user, as will be described in detail below. For example, the system 200 may determine that when the user reaches the state of flow the room temperature is set at 65° F., and the user is listening to a particular tune.

Specifically, the system 200 monitors user's biometric data over a period of time to determine when the user is close to enter a state of flow (i.e., low alpha waves) and when the user is fully immersed in the state of flow (i.e., low alpha waves and high theta waves). By doing this, a baseline of environmental parameters promoting the state of flow, and that can also help maintaining the state of flow, can be identified and recorded by the system 200. In some embodiments, the system 200 can, per user's request, progressively adjust the environmental parameters from the collected data to set the space for promoting and/or maintaining the state of flow.

According to an embodiment, environmental parameters that facilitated the user to reach the flow state during different period of times (e.g., times of the day, days of the week, and/or months of the year) are stored in a state of flow library 216. By doing this, the system 200 can, per user request, actuate the identified environmental parameters and settings to replicate the conditions that lead the user to achieve a state of flow in the past.

Data from the state of flow determination module 214 is stored and classified in the state of flow library 216. By storing the information collected by the state of flow determination module 214, the system 200 can reproduce environmental variables that can facilitate the user entering and staying in a state of flow. In embodiments in which, two or more users are sharing a space, the system 200 can update environmental parameters based on a shared library of environmental parameters.

In this case, shared parameters are chosen and reproduced to help the two or more users achieving a state of flow. It should be note that, in addition to update shared environmental parameters, individual environmental parameters can simultaneously be updated by the system 200. For example, a temperature of the room shared by the two or more users can be averaged to a number that satisfies the users, while specific tunes can be individually delivered via each user's headphones based on an individual history of environmental parameters.

Thus, by analyzing brain wave patterns indicative of entering and maintaining a state of flow, the system 200 is capable of identifying and reproducing the environmental conditions that facilitated the user achieving the state of flow. For example, the system 200 detects when the user is in a state of flow (e.g., state of flow determination module 214) and looks for the environmental parameters to create the state of flow library 216, including current and past environmental conditions.

Figure 3:
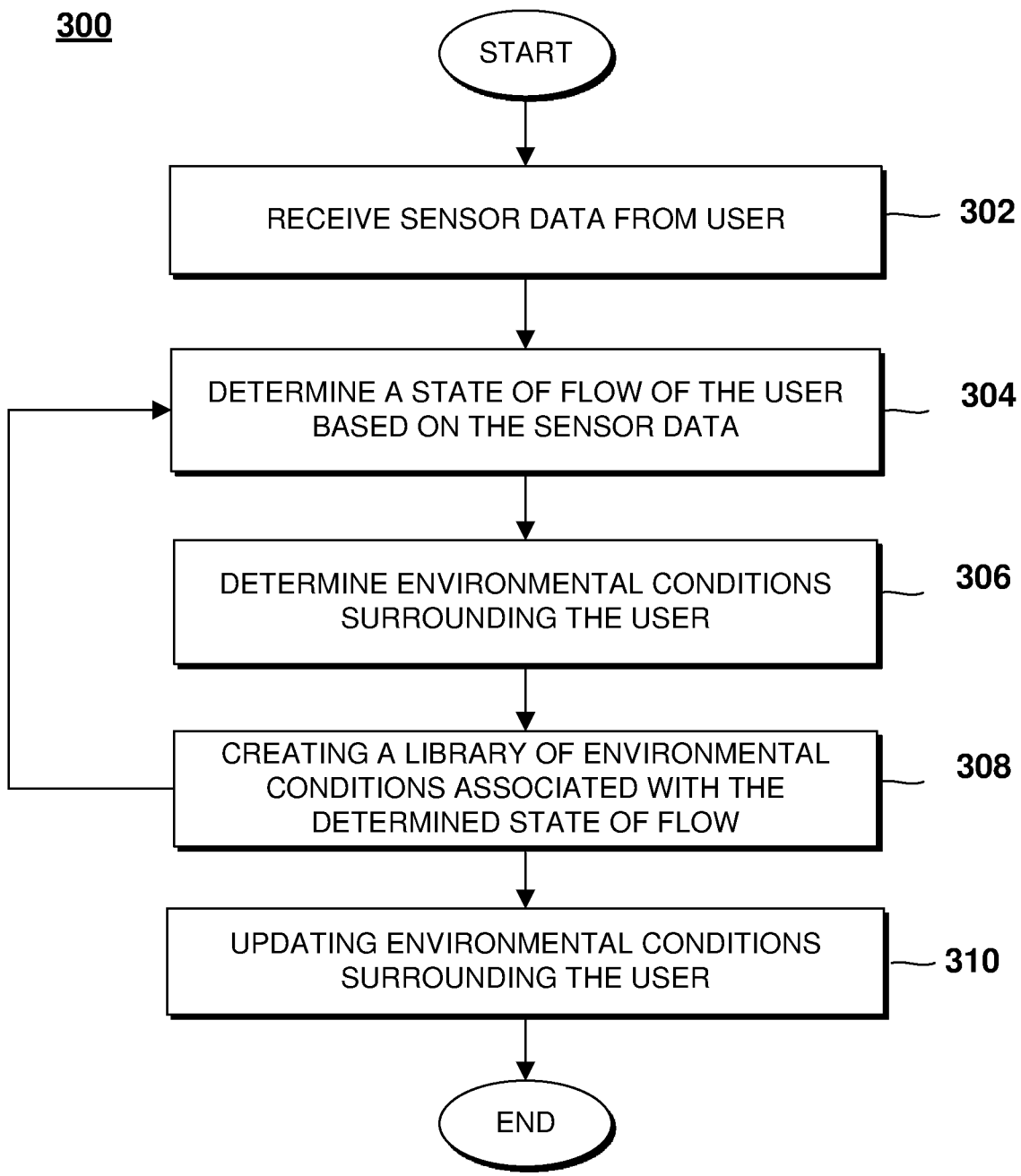
FIG. 3 depicts a flowchart illustrating the steps of a computer-implemented method for arranging an environment based on a user's state of flow, according to an embodiment of the present disclosure.

Referring now to FIG. 3, a flowchart illustrating the steps of a computer-implemented method for arranging a user's environment based on promoting a state of flow is shown, according to an embodiment of the present disclosure.

At step 302, biometric data from one or more sensors incorporated in at least one wearable device wore by a user is received and analyzed, at step 304, to determine whether the user is in a state of flow. Specifically, the received biometric data at step 302 includes measurements of an electric brainwave frequency performed, with prior user authorization, over a period of time. At step 304, it is determined whether the brainwave frequency measurements are equal to a predefined threshold. The predefined threshold corresponds to the electric brainwave frequency being within a range varying from approximately 7 Hz to approximately 8 Hz, that is typically associated with a person being in a state of flow. In an embodiment, the predefined threshold corresponds to an electric brainwave frequency of 7.5 Hz.

In response to determining that the brainwave frequency measurements are within the range associated with the user entering a state of flow, a space occupied by the user is scanned to detect a setting of one or more elements in the space. The one or more elements are associated with a plurality of environmental parameters. As mentioned above, the plurality of environmental parameters can be controlled or adjusted by changing a setting of the one or more elements.

For example, in embodiments in which the environmental parameters include a room temperature, a volume level, and/or a light intensity, the corresponding one or more elements include a thermostat, headphones, a light bulb, etc. Thus, the detected setting of the one or more elements may include, for example, a thermostat set at 65° F. during the month of January, a light bulb set at a medium intensity, headphones set at a low volume, etc. After determining that the user has entered the state of flow, environmental parameters are identified and matched to the user achieving a higher level of concentration.

In some embodiments, notification settings may also be included in the plurality of environmental parameters. In those cases, the proposed method may identify that the user have, for example, turned off notifications (e.g., emails, text messages, social media etc.) from 9:00 am to 10:00 am every Tuesday for the past two months.

A library of (optimal) environmental conditions including a collection of settings of the one or more elements associated with the user reaching a state of flow is created at step 308. The library is available for future use by the user. For example, in a day the user needs to complete a task, he/she may access the library and decide to reproduce the environmental parameters recorded during a day of very high productivity.

At step 310, in response to the user requesting to reproduce the optimal environmental parameters, a current setting of the one or more elements is updated to match the detected settings associated with the user entering a state of flow.

The collection of data associated with the environmental parameters prior and after the user achieves the state of flow, allows for the creation of the library of environmental conditions and corresponding brainwave thresholds within specific time frames (e.g., a time of the day, a week, a year, etc.). Then, per user's request, the library can be accessed by the system 200 (FIG. 2) to reproduce the settings of the one or more elements associated with the user entering a state of flow. For example, the user requests a home assistant "help me entering a state of flow" on a Friday night, the system 200 (FIG. 2) looks at the environmental parameters from the library of environmental conditions with the labels "night", "Friday", "night week day", "night season", after finding the corresponding settings, the system 200 (FIG. 2) starts changing the current environment setting. In some embodiments, numerous iterations can be performed on some environmental parameters depending on the user not entering the state of flow. After the user enters the state of flow, the system 200 (FIG. 2) focuses on maintaining the environmental conditions promoting the state of flow.

Therefore, embodiments of the present disclosure provide a method, system and computer program product to, among other things, update environmental parameters of a physical space occupied by a user or group of users based on sensed brain electrical activity matching an electric frequency associated with a state of flow, and allow the user(s) to reproduce those environmental parameters any time they desire to achieve a state of deeper focus and concentration.

Figure 4:
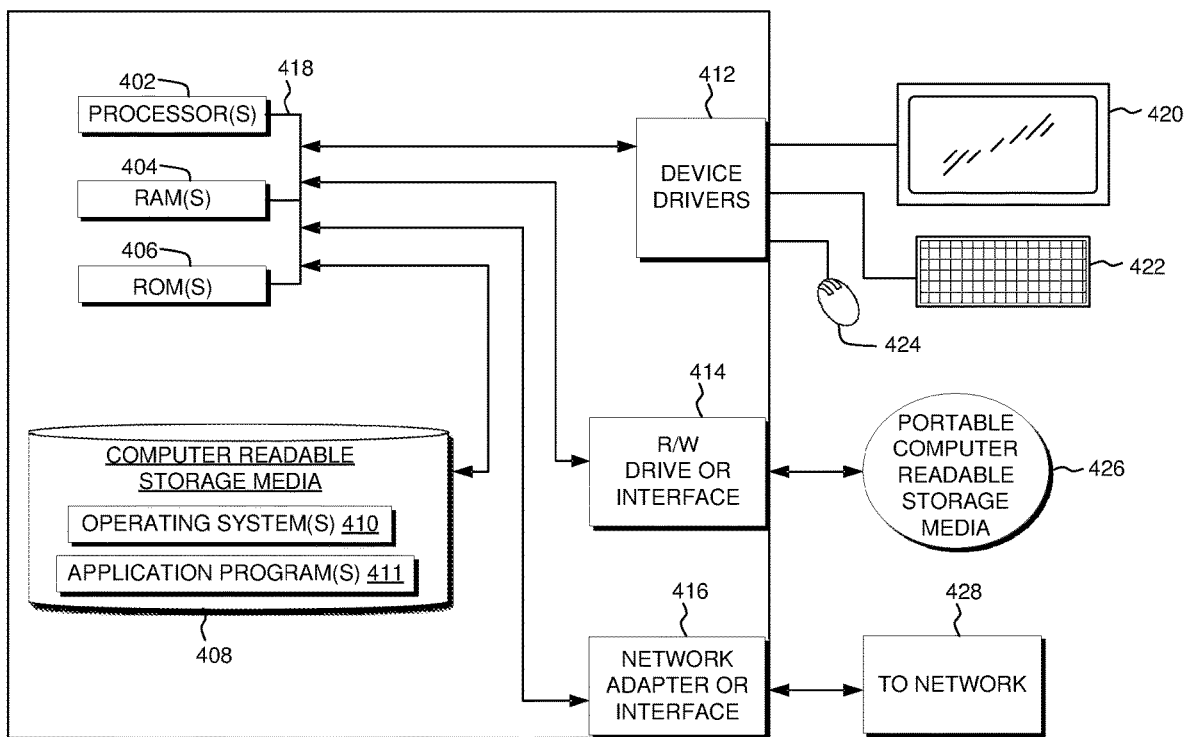
FIG. 4 is a block diagram of internal and external components of a computer system, according to an embodiment of the present disclosure.

Referring now to FIG. 4, a block diagram of components of client computer 102 and server computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
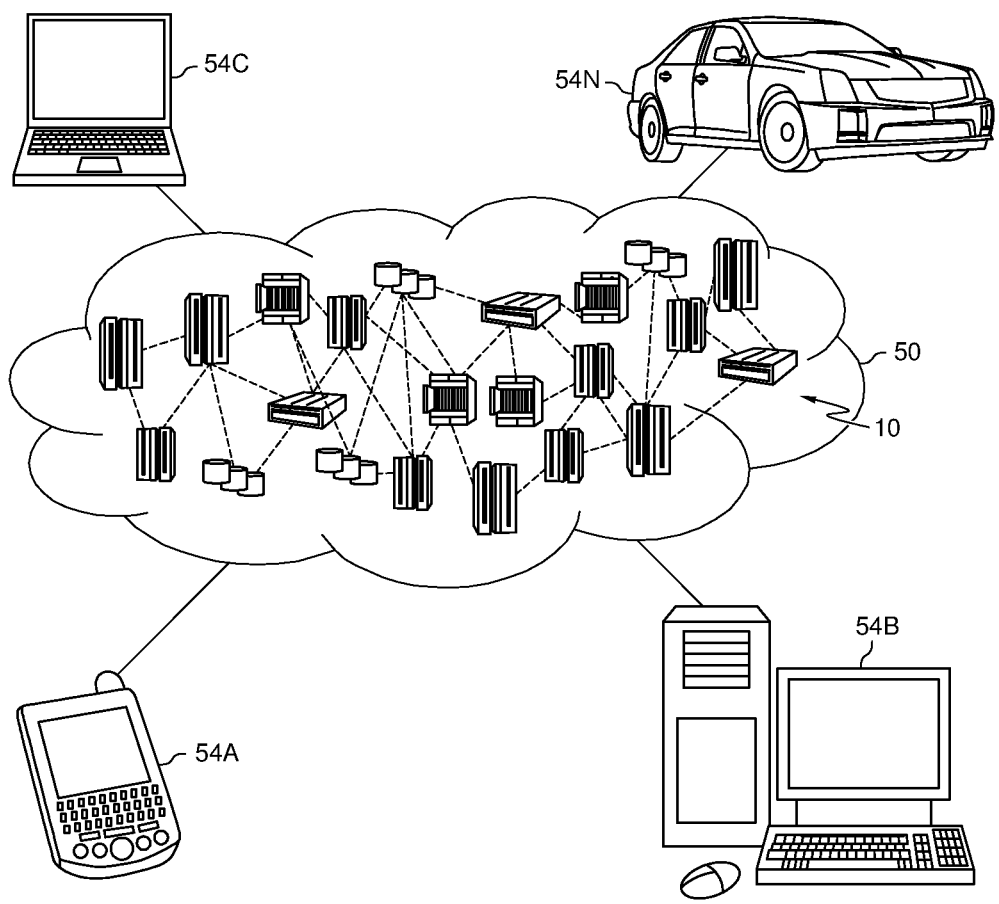
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
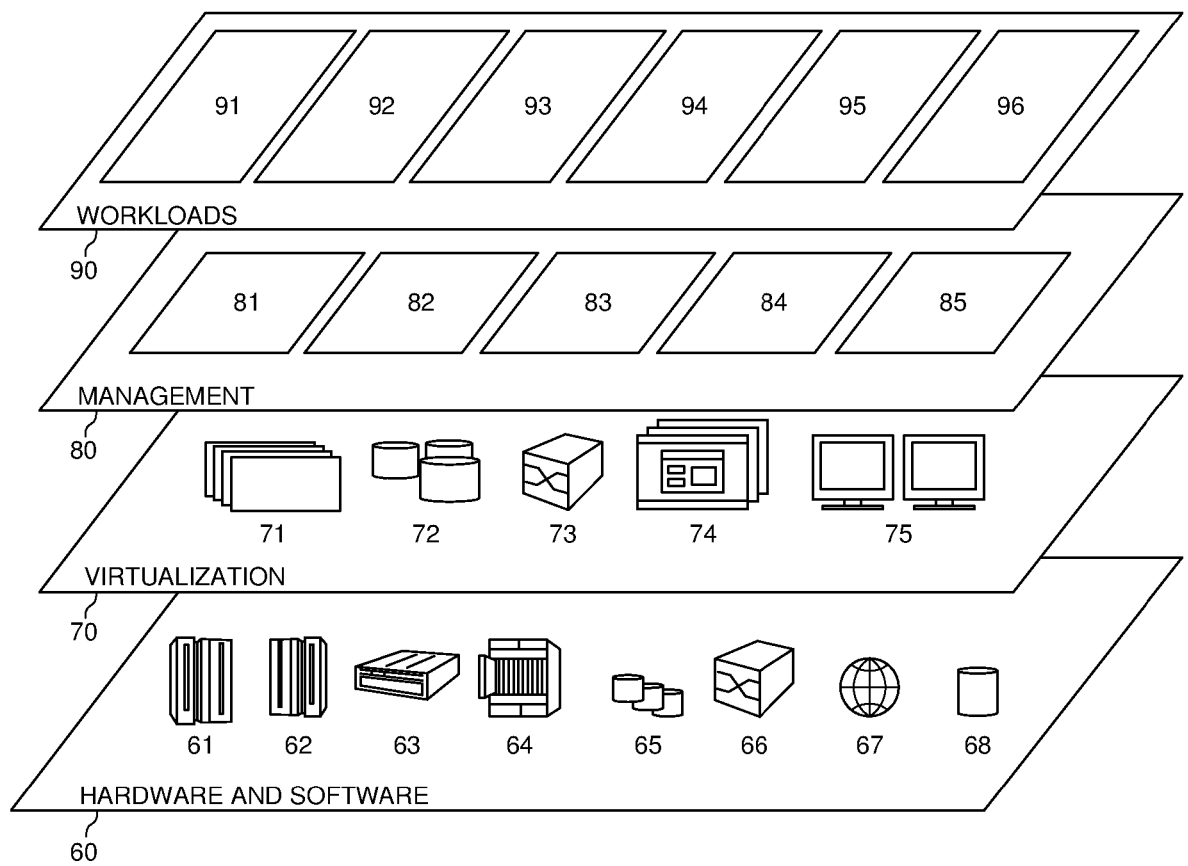
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for dynamic environment arrangement 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for modifying an environment based on a user's state of flow, comprising:
   receiving, by a computer, measurements associated with biometric data of the user from a plurality of sensors, the measurements corresponding to an electric frequency associated with a current state of the user, the user being located in the environment;
   determining, by the computer, whether the measurements correspond to a specified electric frequency threshold that occurs in an alpha-theta border of brainwaves having low frequency alpha brainwaves and high frequency theta brainwaves;
   in response to determining that the measurements correspond to the specified electric frequency threshold, identifying, by the computer, a first setting of one or more elements located in the environment, each of the one or more elements controls an environmental parameter of the environment;
   generating, by the computer, a library of environmental parameters associated with the user's state of flow, the library of environmental parameters comprising the first setting of the one or more elements; and
   in response to a request from the user, adjusting the environmental parameter of the environment to replicate conditions that led the user to achieve a state of flow in the past, wherein the adjusting comprises the computer changing a current setting of the one or more elements based on the library of environmental parameters, wherein the request comprises a request by the user for assistance in entering a state of flow.

2. The method of claim 1, further comprising:
   determining, by the computer, a second setting of the one or more elements, the second setting comprising a current setting of the one or more elements; and
   updating, by the computer, the second setting of the one or more elements to match the first setting of the one or more elements.

3. The method of claim 2, further comprising:
   in response to two or more users being located in the environment, updating, by the computer, a setting of a first element of the one or more elements shared by the two or more users based on an average setting satisfying the two or more users.

4. The method of claim 3, further comprising:
   individually updating, by the computer, a setting of a second element of the one or more elements based on an individual library associated with each of the two or more users.

5. The method of claim 1, wherein the specified electric frequency threshold comprises an electric frequency of approximately 7.5 Hz.

6. The method of claim 1, wherein the one or more elements comprise a plurality of Internet of Things (IOT) devices.

7. The method of claim 1, wherein the environmental parameter comprises a room temperature, a light intensity, a noise level, a music volume, or a notification settings.

8. The method of claim 1, wherein the environmental parameter comprises a room temperature.

9. The method of claim 8, wherein the one or more elements comprises a thermostat that controls the room temperature.

10. The method of claim 1, wherein the environmental parameter comprises music volume.

11. The method of claim 10, wherein the one or more elements comprises headphones that control the music volume.

12. The method of claim 1, wherein the library of environmental parameters comprises a baseline of environmental parameters that promote a state of flow for the user.

13. The method of claim 12, further comprising determining the baseline by monitoring the biometric data of the user and past environmental conditions over a period of time to determine ones of the past environmental conditions that promote the user entering a state of flow.

14. The method of claim 1, wherein the generating is performed after the receiving, the determining, and the identifying.

15. The method of claim 14, wherein the adjusting is performed after the generating.

* * * * *